United States Patent
Willett

(10) Patent No.: US 8,459,980 B2
(45) Date of Patent: Jun. 11, 2013

(54) ANNEXED PINNING SYSTEM

(75) Inventor: Paul Eaton Willett, Whiteside (AU)

(73) Assignee: Moffat Pty Limited, Mulgrave (AU)

( * ) Notice: Subject to any disclaimer, the term of this patent is extended or adjusted under 35 U.S.C. 154(b) by 234 days.

(21) Appl. No.: 12/946,111

(22) Filed: Nov. 15, 2010

(65) Prior Publication Data

US 2011/0135776 A1 Jun. 9, 2011

(30) Foreign Application Priority Data

Dec. 8, 2009 (AU) ................. 2009905987

(51) Int. Cl.
*A21C 3/02* (2006.01)

(52) U.S. Cl.
USPC .................. 425/238; 425/223; 425/367

(58) Field of Classification Search
USPC .................................. 425/223, 238
See application file for complete search history.

(56) References Cited

U.S. PATENT DOCUMENTS

| | | | | |
|---|---|---|---|---|
| 4,083,668 | A | * | 4/1978 | Bardwick et al. ............ 425/194 |
| 6,024,554 | A | * | 2/2000 | Lawrence ..................... 425/310 |
| 6,698,338 | B2 | * | 3/2004 | Ancona et al. ................ 425/190 |
| 2001/0001281 | A1 | * | 5/2001 | Weder et al. .................. 425/135 |

* cited by examiner

*Primary Examiner* — Yogendra Gupta
*Assistant Examiner* — Alison Hindenlang
(74) *Attorney, Agent, or Firm* — Christensen O'Connor Johnson Kindness PLLC

(57) ABSTRACT

A dough molder 16 including two or more first sheeting rollers 1, 5, which define a dough path to a conveyor 3, two or more second sheeting rollers 6, 7, and an inlet 18 for receiving dough from an operator. A diverter 13 is moveable between a position to allow dough to be fed to the second sheeting rollers or exclusively to the first pair of sheeting rollers.

9 Claims, 5 Drawing Sheets

ANNEXED PINNING SYSTEM

FIELD OF THE INVENTION

This invention relates to a dough moulder and attachment for a dough moulder and particularly a pining system for a dough moulder.

BACKGROUND OF THE INVENTION

Small scale shop front bakeries (e.g. in commercial shopping outlets or the bakery departments in supermarkets) are becoming increasingly popular. Within small scale bakeries a premium is placed on working space. It is desirable to be able to efficiently produce a wide range of products and to have a flexible production schedule.

In small scale bakeries many of the products are produced in relatively small runs. The economics of a small scale bakery is generally improved if many types of product can be produced from only a few pieces of equipment.

Dough moulders are conventionally used to receive a piece of pre-weighted dough and mould that dough to a desired shape for a specific bakery product before it is proved and baked. In a conventional dough moulder, the dough passes through a pair of sheeting rollers onto a conveyor where the dough is rolled under a curling mat or chain. The conveyor and the curling mat or chain together form a curler. The passing of the dough through the sheeting rollers is part of the necessary mechanical working of the dough. In the curler the dough is rolled into a cylindrical piece under the curling mat for either later separation into appropriate sizes for products such as bread rolls, or bread loaves.

The applicant has previously developed a bread and roll moulding machine. These machines generally consist of a set of one or more sheeting rollers, a curling chain, a conveyor and a means for pressure rolling the curled up dough form into a loaf shaped portion, and product exits onto catch tray. These machines operate by feeding a portion of dough into the sheeting rollers where the dough is flattened out into a pancake like portion. The dough then travels by the conveyor to the curling chain where the leading edge of the dough portion is curled up as the conveyor passes under the curling chain.

To make a batch of scrolls, a piece of dough (typically 2.5 kilograms) in weight is "pinned out" (often using a simple rolling pin). Typically the dough is pinned out to form a sheet approximately 2 meters long, 500 mm wide and 3 to 5 mm thick. Any fillings are placed on all or part of the sheet of dough and the sheet is rolled up about its long axis into a 2 meter long "sausage". The sausage is then transversely cut into disk-like portions (typically 80 to 100 grams each) which are placed on their flat, circular, side for baking.

Other products such as hamburger rolls, baps and pizza bases are formed from sheeted, uncurled, dough. Although scrolls and these other products scrolls are popular, the space and cost of a dedicated "sheeting" machine can rarely be justified in the context of a small scale bakery. The process of "pinning out" (or "sheeting") is therefore typically performed by hand. As such the thickness, quality and consistency often varies greatly from baker to baker.

It would be an improvement for the operation of small scale bakeries, if pinning out of the dough to produce products such as scrolls could be performed on the existing equipment or an attachment or adaption of existing equipment.

To achieve a desirable dough consistency, the dough must be worked. According to the described proposal the sheet of dough collected from the conveyor must be returned to the rollers a few times to achieve a suitable dough consistency.

To collect dough from the conveyor, the operator must reach past any safety guard arrangement. This is thought to be awkward, particularly in view of the potentially repetitive nature of the operation.

Other proposals for modifying existing dough moulders to suit the production of scrolls have involved sheeting rollers which can be moved relative to the conveyor for different dough moulding applications. The time and effort associated with moving the rollers and/or conveyor is undesirable.

It is an object of the invention to provide an improved dough moulder.

It is not admitted that any of the information in this specification is common general knowledge, or that the person skilled in the art could be reasonably expected to have ascertained, understood, regarded it as relevant or combined it in anyway at the priority date.

SUMMARY OF THE INVENTION

According to one aspect of the invention, there is provided a dough moulder including
two or more first sheeting rollers, defining a dough path to a conveyor
two or more second sheeting rollers,
an inlet for receiving dough from an operator, and
a diverter moveable between a position to allow dough to be fed to the second pair of sheeting rollers or exclusively to the first pair of sheeting rollers.

The moulder may be provided with an outlet for dough from the second sheeting rollers. Preferably the inlet and the outlet are proximal for an operator to comfortably return sheeted dough from the outlet to the inlet. Preferably there is a pair of first sheeting rollers and a pair of second sheeting rollers.

The inlet may be configured to allow dough to be conveyed to the first sheeting rollers at all times during operation, in which case the inlet may include the diverter which is selectively positionable for conveying dough exclusively to the first sheeting rollers. The diverter may be positionable to allow respective dough pieces to be conveyed to the second sheeting rollers. In this position, dough may simultaneously be fed to the first sheeting rollers.

Preferably the dough moulder includes two second sheeting rollers defining a nip point through which dough is sheeted. The second sheeting rollers may operate at slower surface speed than the first sheeting rollers. The relative position of the second sheeting rollers is preferably adjustable to very the width of the nip point.

The second sheeting rollers may be arranged to be driven by one of the first sheeting rollers. According to preferred forms of the invention, the second sheeting rollers mechanically engage with at least one of the first sheeting rollers.

Preferably a guard arrangement to limit operator access to active rollers is provided. The guard arrangement may limit operator access to active rollers by deactivating the rollers when an operator approaches the rollers.

Preferably the invention further includes an annexe structure including the second sheeting rollers and preferably the guard arrangement. The annexe structure is preferably relocatable to clean the moulder. The annexe structure including the second sheeting rollers and the guard arrangement may be pivotable about one of the first sheeting rollers, This enable the second sheeting rollers and guard arrangement to maintain their relative positions when pivoted away from the first sheeting rollers to clean the moulder.

Preferably one of the second sheeting rollers is driven from one of the first sheeting rollers, the drive roller may be the axis for pivotal rotation of the annexe.

The conveyor may further include a flexible curling element (such as a curling chain or curling mat) to curl product which has passed through the first sheeting rollers.

Another aspect of the invention provides a sheeting attachment for a dough moulder; the dough moulder including two or more first sheeting rollers and a conveyor defining a path for the dough, the sheeting attachment including two or more second sheeting rollers defining a nip point through which dough is sheeted
an inlet for receiving dough from an operator; and
a diverter moveable between a position to allow dough to be fed to the second pair of sheeting rollers or exclusively to the first pair of sheeting rollers.

Preferably two second sheeting rollers on the sheeting attachment define a nip point through which dough is sheeted. The second sheeting rollers may operate at slower surface speed than the first sheeting rollers. The relative position of the second sheeting rollers is preferably adjustable to very the width of the nip point.

The second sheeting rollers may be arranged to be driven by one of the first sheeting rollers of the dough moulder. According to preferred forms of the invention, the second sheeting rollers mechanically engage with at least one of the first sheeting rollers.

Preferably a guard arrangement to limit operator access to active rollers is provided on the sheeting attachment. The guard arrangement may limit operator access to active rollers by deactivating the rollers when an operator approaches the rollers.

BRIEF DESCRIPTION OF THE DRAWINGS/FIGURES

Figure 2:
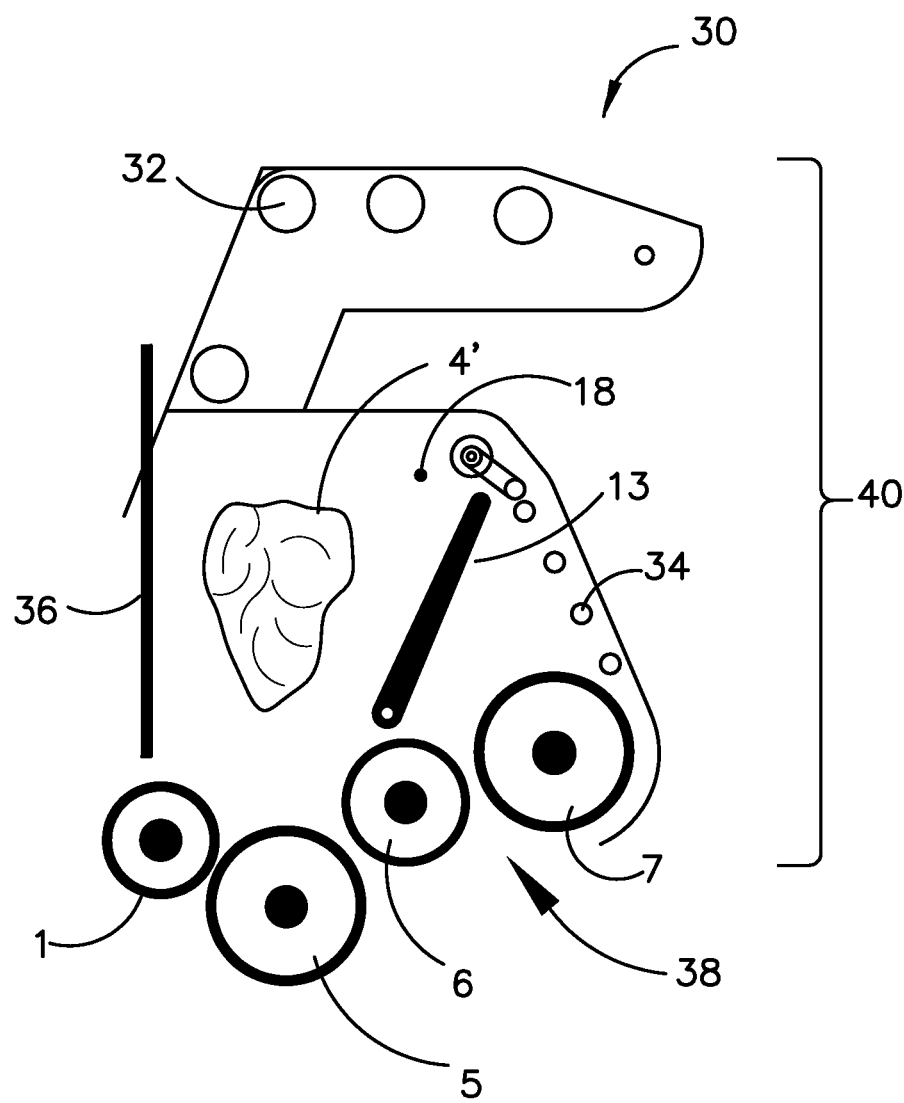
FIG. 2 is a close up view of the rollers inlet and guard region of the cross-section of FIG. 1.
Figure 3:
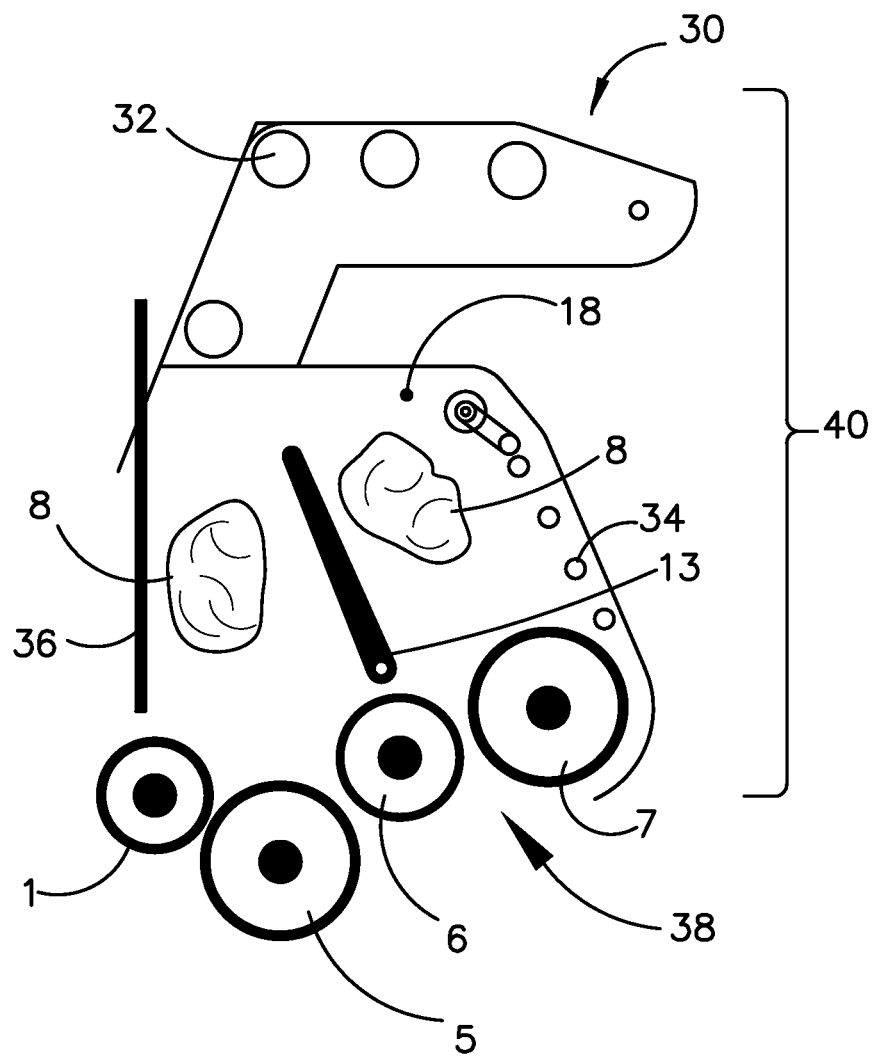
Figure 4:
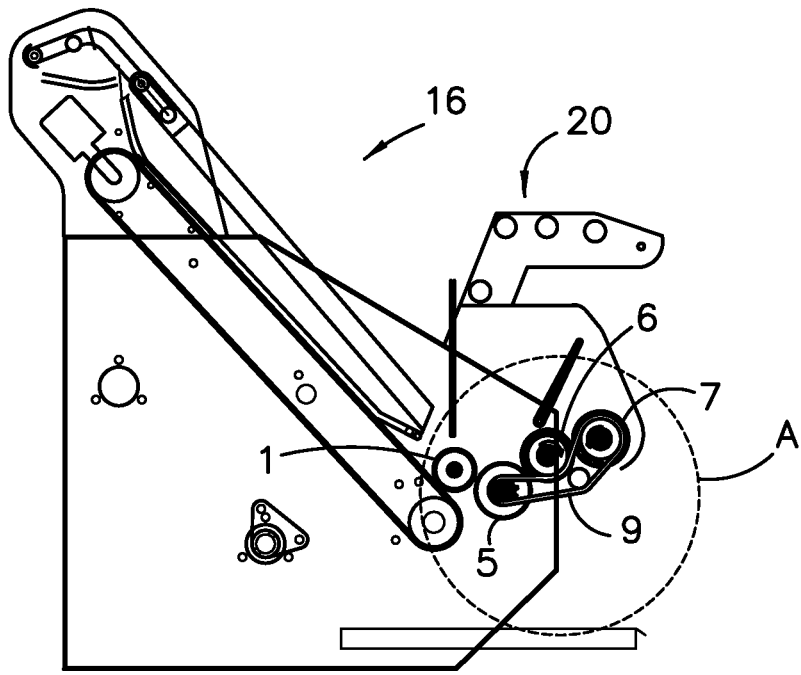
Figure 5:
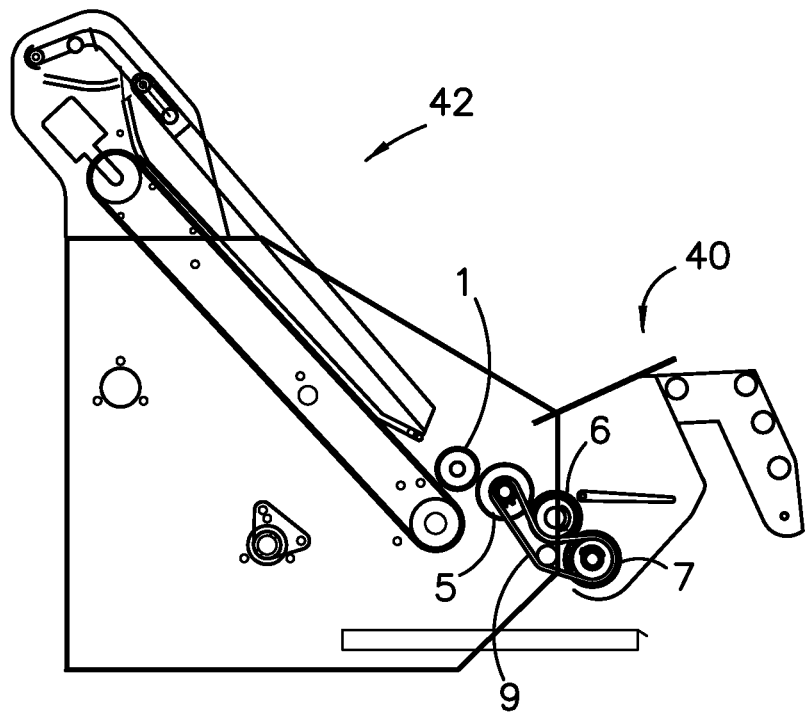
Figure 6:
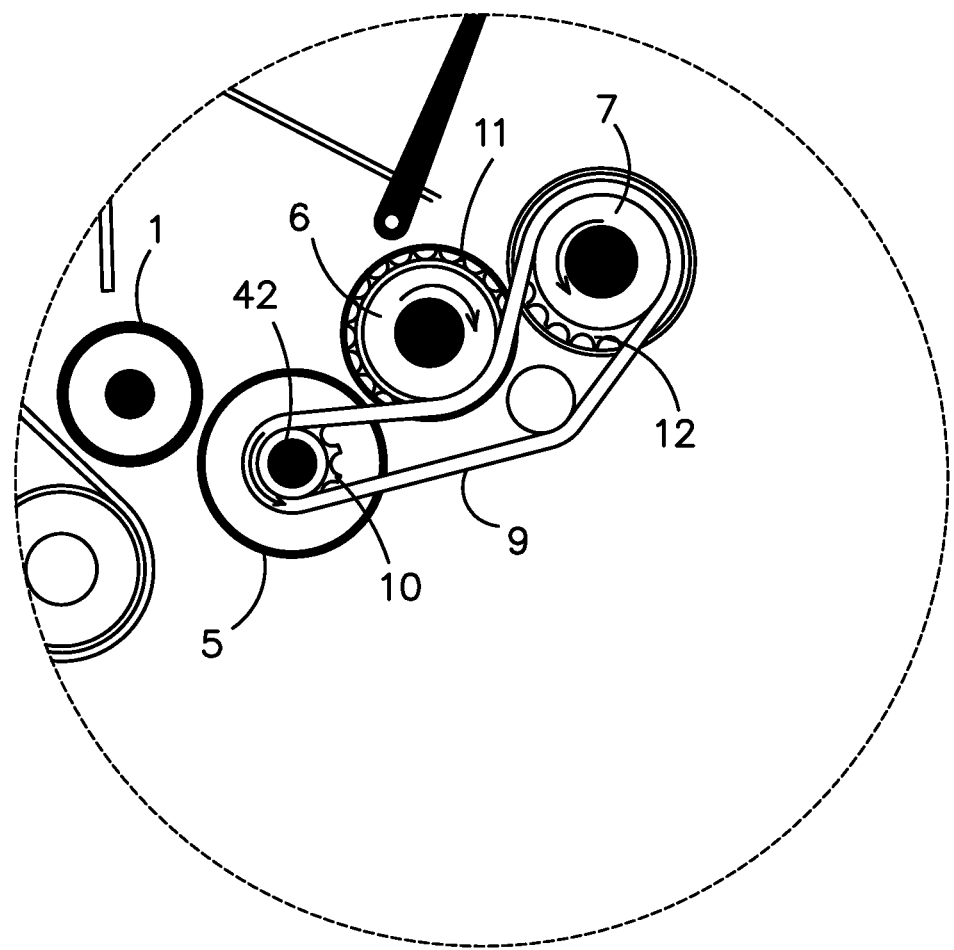

FIG. 3 corresponds to FIG. 2 with the diverter in an intermediate position;

FIG. 4 is a cross-section view of a dough moulder in accordance with a preferred embodiment of the invention;

FIG. 5 is a cross-section view of the dough moulder of FIG. 4 in the cleaning mode, and FIG. 6 corresponds to the circle A in FIG. 5.

DETAILED DESCRIPTION OF THE EMBODIMENTS

Figure 1:
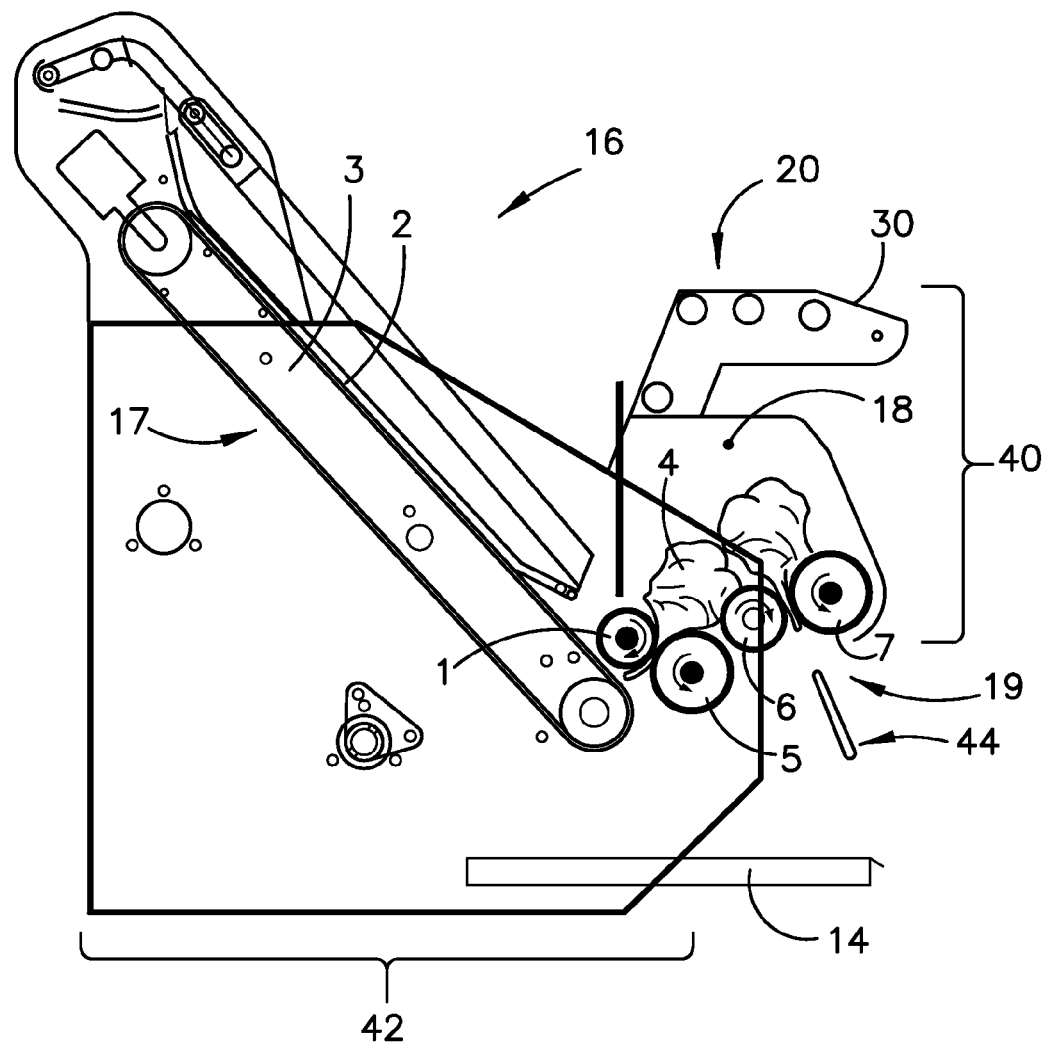
FIG. 1 is a cross-section view of a dough moulder in accordance with an embodiment of the invention.

FIG. 1 shows a sectional side view of a dough moulder 16 in accordance with an embodiment of the invention.

The dough moulder 16 includes two 'first sheeting rollers' 1 and 5. The rollers 1 and 5 together define a nip point through which dough may be sheeted. The rollers 1 and 5 flatten out the dough into a pancake like portion. The rollers 1 and 5 are positioned to deliver sheeted dough to a lower end of a conveyor 3. The rollers 1 and 5 extend horizontally across the width of the dough moulder 16.

The dough moulder 16 includes a mechanism for moving roller 1 to adjust the gap between rollers 1 and 5. The location of roller 5 is fixed relative to the body of the dough moulder 16.

The conveyor 3 extends obliquely upwardly away from the rollers 1 and 5 towards a rear of the dough moulder 16 (i.e. away from the operator). The conveyor upwardly carries sheeted dough from the rollers 1 and 5. A curling mat 2 overlies the conveyor 3 and operates on the sheeted dough carried on the conveyor to curl (or "roll") the dough. Thus, the curling mat 2 and conveyor 3 together define a curler 17. The leading edge of the dough portion is curled up as the conveyor 3 passes under the curling chain 2.

The curled dough may be collected from the conveyor 3 by an operator or automatically transferred to further apparatus for further processing. By way of example, curled dough might pass directly from the top of conveyor 3 to a pressure rolling board (not shown) positioned under the conveyor 3 before being returned to the operator via a catch tray 14.

Two "second sheeting rollers" 6 and 7 (sometimes referred to as bap rollers) run parallel to the rollers 1 and 5. The rollers 6 and 7 are spaced to define a nip point 38 through which the dough is sheeted. The rollers 6 and 7 are positioned forward (i.e. toward the operator) of, and slightly above, the rollers 1 and 5. The dough moulder 16 includes an adjustment mechanism for moving roller 6 to adjust the relative spacing of the rollers 6, 7 and thereby vary the width of the nip point 38 to suit differing applications.

In some applications the dough may be passed through the second sheeting rollers 6, 7, before the nip point is narrowed and the (now sheeted) dough returned to the rollers 6, 7 for a second pass. This process can be repeated whereby the dough desirably is progressively worked down to the desired thickness.

The dough moulder 16 defines inlet 18 and outlet 19 in the form respective regions of space respectively above and below the rollers 6 and 7.

The inlet 18 provides a path for receiving dough from an operator to the rollers 6 and 7. The outlet 19 conveys sheeted dough 44 from the rollers 6 and 7 to the operator. In this embodiment the inlet 18 also provides access to the rollers 1 and 5 whereby an operator may present dough to rollers 1 and 5 to produce curled dough, or present dough to the rollers 6 and 7 to produce sheeted dough.

As the operator stands on the right side of the moulder shown in FIG. 2, outlet 19 is arranged to deliver sheeted dough 44 directly into the operator's hands. The inlet 18 and the outlet 19 are proximally positioned whereby the flattened dough piece is returned back to the operator without the operator having to move from their position in front of the machine or reach toward difficult areas of the machine. This adds significantly to the operator comfort and safety as such movement and reaching is thought to be associated with long term repetitive strain injury (RSI).

As illustrated in FIG. 2, the inlet 18 includes a diverter 13. The diverter 13 is formed by a simple flap pivotally mounted at it's lower extent adjacent to the roller 6. The diverter is selectively pivoted fore and aft to partly define a selected dough inlet path to guide dough 4' from the operator to a selected one of the first sheeting rollers 1, 5 and second sheeting rollers 6,7.

When in the position shown in FIG. 2, the dough is prevented from being fed to the second sheeting rollers 6, 7 and is fed exclusively to the first sheeting rollers 1, 5. As shown in FIG. 3, the diverter 13 may be pivoted to a position wherein the operator may feed dough to the second sheeting rollers while still being able to feed small pieces of dough to the first sheeting rollers 1, 5 simultaneously. While the diverter may be constructed to also pivot to block the access to the first sheeting rollers 1, 5 restriction of access to the first rollers this is not a practical requirement.

The diverter 13 is readily moved between the fore, aft positions to enable the second sheeting rollers to be used while still enabling small pieces of dough to be passed to the first sheeting rollers. Preferred embodiments thus eliminate the time to convert the machine from one mode to another as in various other moulding machines.

The dough moulder 16 includes a safety guard 30 which acts to prevent an operator contacting the rollers 1, 5, 6 and 7 when active.

The dough-feeding path is shaped so that an operator cannot reach the rollers 1, 5, 6 and 7 when in the feeding position. A rear wall 36 defines a rearward extent of the dough-inlet path.

Referring to FIG. 2, the guard 30 also includes spaced bars 34 which allow an operator to see the rollers 6 and 7 but prevent the operator's fingers reaching the nip point 38 from above.

Turning to FIGS. 1 and 5, the illustrated dough moulder 16 includes a dough sheeting and moulding portion 42 and a sheeting attachment 40. The dough sheeting and moulding is generally used for larger dough pieces and also for curling dough with the aid of a curling mat or chain. The sheeting attachment 40 includes an annexe structure supporting rollers 6, 7, guard 30, diverter 13 and wall 36, and is conveniently adapted to the retro-fitted to existing dough curling moulding machines.

During use the sheeting attachment 40 sits upright whereby an operator can feed dough downwardly through the inlet 18 toward the rollers 1, 5, 6 and 7. The attachment 40 is pivotally connected to the dough moulding portion 42 so that attachment 40 may be pivoted forward (toward the operator) and down to provide access to various components (such as the conveyor 3 and the curling mat 2) for cleaning. In this embodiment, the attachment 40 is carried by bearings to pivot relative to the dough curling portion 42 about an axis which coincides with the roller 5. As will be described this construction is advantageous.

The rollers 6 and 7 are mechanically driven by the roller 5. Referring to FIG. 6, a chain 9 engages with a sprocket 10 fixed to a shaft 42 carrying the roller 5. The chain 10 in turn engages with sprockets 11 and 12 which are respectively fixed relative to rollers 6 and 7. The chain 10 thereby transmits drive from the roller 5 to the rollers 6 and 7. The chain 9 follows a serpentine path around the sprockets 11 and 12 whereby sprockets 11 and 12 are driven in opposite directions.

Sprocket 10 is smaller than sprockets 11 and 12 to create a reduction ratio whereby the rollers 6 and 7 rotate at a lower speed than roller 5. The rollers 5, 6 and 7 have a similar outside diameter such that the reduction ratio results in the rollers 6 and 7 having a lower surface speed than the roller 5. This is thought to improve safety of operation and the quality of the finished product. Of course it is also possible that the rollers 6 and 7 might be driven at higher speed, potentially higher than the roller 5, to suit other applications.

The location of roller 7 is fixed within the attachment 40 whereby, as the attachment 40 is rotated for cleaning about the roller 5 a chain circuit defined by the chain 9 remains a fixed length. The adjustment mechanism by which roller 6 is relocated to adjust the width of nip point 38 (see FIG. 2) is configured so that any variation in the length of the chain circuit during said adjustment is negligible. According to this preferred embodiment, the dough moulder 16 and can be used and cleaned without varying the length of the chain.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A dough moulder including:
   (a) at least one pair of first sheeting rollers defining a dough path to a conveyor; and
   (b) an annexe structure pivotally mounted about a pivot axis coincidental with one of the pair of first sheeting rollers, the annexe structure including:
       (i) at least one pair of second sheeting rollers; and
       (ii) a diverter moveable between a position to allow dough to be fed to the pair of second sheeting rollers or exclusively to the pair of first sheeting rollers,
       (iii) the pair of second sheeting rollers defining a dough path to an outlet proximal an operator located at an operator dough feeding position, the pair of second sheeting rollers being mechanically driven by the pair of first sheeting rollers; and
       (iv) an inlet for receiving dough from an operator located at the operator dough feeding position.

2. The moulder of claim 1, wherein the inlet includes the diverter.

3. The moulder of claim 1, wherein the diverter is positionable to allow dough to be simultaneously fed to the pair of first sheeting rollers and to the pair of second sheeting rollers.

4. The moulder of claim 1, wherein the pair of second sheeting rollers define a nip point through which dough is sheeted.

5. The moulder of claim 4, wherein the relative position of the pair of second sheeting rollers is adjustable to vary the width of the nip point.

6. The moulder of claim 1, configured such that the pair of second sheeting rollers operate at slower surface speed than the pair of first sheeting rollers.

7. The moulder of claim 1, wherein the annexe further includes a guard arrangement configured to limit operator access to active rollers by deactivating the rollers when an operator approaches the rollers.

8. A sheeting attachment for a dough moulder, the dough moulder including at least one pair of first sheeting rollers and a conveyor defining a path for the dough, the sheeting attachment including:
   an annexe structure pivotally mountable about a pivot axis coincidental with one of the first sheeting rollers, at least one pair of second sheeting rollers defining a nip point through which dough is sheeted;
   an inlet for receiving dough from an operator located at an operator dough feeding position; and
   diverter moveable between a position to allow the dough to be fed to the pair of second sheeting rollers or, exclusively to the pair of first sheeting rollers, the pair of second sheeting rollers defining a dough path to an outlet proximal the operator dough feeding position of the operator, the pair of second sheeting rollers being engageable with one of the first pair of sheeting rollers to be mechanically driven by the pair of first sheeting rollers.

9. The attachment of claim 8, including a guard arrangement configured to limit operator access to active rollers by deactivating the rollers when an operator in the operator dough feeding position approaches the rollers.

* * * * *